United States Patent
Qiao et al.

(10) Patent No.: US 11,625,896 B2
(45) Date of Patent: Apr. 11, 2023

(54) FACE MODELING METHOD AND APPARATUS, ELECTRONIC DEVICE AND COMPUTER-READABLE MEDIUM

(71) Applicant: BEIJING KUANGSHI TECHNOLOGY CO., LTD., Beijing (CN)

(72) Inventors: Liang Qiao, Beijing (CN); Keqing Chen, Beijing (CN); Haibin Huang, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 17/267,723

(22) PCT Filed: Aug. 9, 2019

(86) PCT No.: PCT/CN2019/100023
§ 371 (c)(1),
(2) Date: Feb. 10, 2021

(87) PCT Pub. No.: WO2020/063139
PCT Pub. Date: Apr. 2, 2020

(65) Prior Publication Data
US 2021/0319621 A1    Oct. 14, 2021

(30) Foreign Application Priority Data
Sep. 26, 2018   (CN) .......................... 201811124137.2

(51) Int. Cl.
*G06T 17/20*        (2006.01)
*G06T 3/00*         (2006.01)
(Continued)

(52) U.S. Cl.
CPC .......... *G06T 17/205* (2013.01); *G06T 3/0031* (2013.01); *G06T 3/4038* (2013.01);
(Continued)

(58) Field of Classification Search
CPC ... G06T 17/205; G06T 3/0031; G06T 3/4038; G06T 19/20; G06T 2219/2004;
(Continued)

(56) References Cited

U.S. PATENT DOCUMENTS 11,195,318 B2 * 12/2021 Suma .................... G06T 15/005
2009/0296984 A1   12/2009 Nijim et al.
(Continued)

FOREIGN PATENT DOCUMENTS

CN     101958008     1/2011
CN     104077808    10/2014
(Continued)

OTHER PUBLICATIONS

Sun et al., "Registration of Texture Image and Point Clouds Model in 3D Reconstruction", School of Electronics and Information, Northwestern Polytechnical University, Xi'an Shanxi, China, Nov. 2011, 4 pages.
(Continued)

*Primary Examiner* — YuJang Tswei
(74) *Attorney, Agent, or Firm* — Hamre, Schumann, Mueller & Larson, P.C.

(57) ABSTRACT

A face modeling method and apparatus, an electronic device and a computer-readable medium. Said method comprises: acquiring multiple depth images, the multiple depth images being obtained by photographing a target face at different irradiation angles; performing alignment processing on the multiple depth images to obtain a target point cloud image; using the target point cloud image to construct a three-dimensional model of the target face. The present disclosure
(Continued)

alleviates the technical problems of poor robustness and low precision of the three-dimensional model constructed according to the three-dimensional model constructing method.

15 Claims, 3 Drawing Sheets

(51) Int. Cl.
| | |
|---|---|
| *G06T 3/40* | (2006.01) |
| *G06T 19/20* | (2011.01) |
| *G06T 15/04* | (2011.01) |
| *G06T 7/55* | (2017.01) |
| *G06T 17/00* | (2006.01) |

(52) U.S. Cl.
CPC ............... *G06T 19/20* (2013.01); *G06T 7/55* (2017.01); *G06T 15/04* (2013.01); *G06T 17/00* (2013.01); *G06T 2207/30201* (2013.01); *G06T 2210/56* (2013.01); *G06T 2219/2004* (2013.01)

(58) Field of Classification Search
CPC ..... G06T 15/04; G06T 2210/56; G06T 17/00; G06T 7/55; G06T 2207/30201
See application file for complete search history.

(56) References Cited

U.S. PATENT DOCUMENTS

| | | | | |
|---|---|---|---|---|
| 2010/0315424 A1* | 12/2010 | Cai | ................... | G06T 17/00 |
| | | | | 345/427 |
| 2011/0043610 A1* | 2/2011 | Ren | ................... | G06T 17/00 |
| | | | | 348/46 |
| 2014/0285486 A1* | 9/2014 | Chang | ................ | G06T 7/579 |
| | | | | 345/420 |
| 2017/0024921 A1* | 1/2017 | Beeler | ................. | G06T 13/40 |
| 2017/0046868 A1* | 2/2017 | Chernov | .............. | G06T 7/246 |
| 2017/0324947 A1* | 11/2017 | Bruce | ................ | H04N 13/296 |
| 2018/0018805 A1* | 1/2018 | Kutliroff | ............... | G06T 7/33 |
| 2019/0035149 A1* | 1/2019 | Chen | ................... | G06T 17/20 |
| 2020/0184651 A1* | 6/2020 | Mukasa | .............. | G06T 7/194 |
| 2021/0209777 A1* | 7/2021 | Zhao | ................... | H04N 21/816 |

FOREIGN PATENT DOCUMENTS

| | | |
|---|---|---|
| CN | 106327571 | 1/2017 |
| CN | 106570822 | 4/2017 |
| CN | 106709947 | 5/2017 |
| CN | 106803267 | 6/2017 |
| CN | 107945267 | 4/2018 |
| CN | 109242961 | 1/2019 |

OTHER PUBLICATIONS

International Search report, issued in the corresponding PCT application No. PCT/CN2019/100023, dated Oct. 28, 2019, 17 pages.
First Chinese Office Action, issued in the corresponding Chinese patent application No. 201811124137.2, dated Dec. 23, 2019, 17 pages.

* cited by examiner

FACE MODELING METHOD AND APPARATUS, ELECTRONIC DEVICE AND COMPUTER-READABLE MEDIUM

The present application claims the priority of Chinese patent application No. 201811124137.2 filed on Sep. 26, 2018, for all purposes, the entire disclosure of the aforementioned application is incorporated by reference as part of the disclosure of this application.

TECHNICAL FIELD

Embodiments of the present disclosure relate to a face modeling method and apparatus, an electronic device, and a computer-readable medium.

BACKGROUND

With the rapid development of computer graphics and image processing technology, the three-dimensional face modeling technology based on computer and image processing has been widely used in many fields (such as game animation, television advertising) and other related industries, and has gradually become a hot research issue.

In a technology, when constructing a three-dimensional face model, RGB images of an object are used to realize the construction of the three-dimensional face model. This scheme has the following disadvantages, for example, the three-dimensional model has poor robustness and is greatly interfered by light; and the accuracy of three-dimensional model is low.

SUMMARY

In view of this, at least one embodiment of the present disclosure provides a face modeling method and apparatus, an electronic device, and a computer-readable medium, so as to alleviate the technical problems of poor robustness and low accuracy of the three-dimensional model constructed by another three-dimensional model construction method.

In the first aspect, at least one embodiment of the present disclosure provides a face modeling method, and the method comprises: acquiring a plurality of frames of depth images, in which the plurality of frames of depth images are obtained by shooting a target face with a depth camera at different shooting angles; performing depth image alignment processing on the plurality of frames of depth images to obtain a target point cloud image, in which the target point cloud image comprises a plurality of three-dimensional vertices, and a three-dimensional coordinate and a normal vector of each three-dimensional vertex; and constructing a three-dimensional model of the target face by using the target point cloud image.

Further, performing depth image alignment processing on the plurality of frames of depth images to obtain the target point cloud image, comprises: transforming each frame of depth image into a three-dimensional point cloud image, in which the three-dimensional point cloud image comprises three-dimensional coordinates and normal vectors of respective three-dimensional vertices in a point cloud; and performing vertex alignment processing on the respective three-dimensional vertices in respective three-dimensional point cloud images to obtain the target point cloud image.

Further, performing alignment processing on the respective three-dimensional point cloud images of respective frames of depth images to obtain the target point cloud image, comprises: aiming at an M-th frame of depth image of the plurality of frames of depth images, performing point cloud matching on a three-dimensional point cloud image of the M-th frame of depth image and a predicted point cloud image, and determining pose information of the M-th frame of depth image shot by the depth camera according to a point cloud matching result; determining position information of respective vertices in the three-dimensional point cloud image of the M-th frame of depth image in real space based on the pose information; fusing the three-dimensional point cloud image of the M-th frame of depth image into the predicted point cloud image by using the position information; and repeatedly executing the above steps until a three-dimensional point cloud image of an N-th frame of depth image being fused into a predicted point cloud image, after aligning three-dimensional point cloud images of previous (N-1) frames of depth images, to obtain the target point cloud image, in which N is an amount of depth images, M is less than or equal to N, the predicted point cloud image is a point cloud image after aligning three-dimensional point cloud images of previous (M-1) frames of depth images, and the M-th frame of depth image is an M-th frame of depth image taken by the depth camera on the target face.

Further, the three-dimensional model comprises a plurality of three-dimensional vertices, and one three-dimensional vertex corresponds to one vertex in the target point cloud image; and constructing the three-dimensional model of the target face by using the target point cloud image, comprises: determining vertices, which corresponds to respective three-dimensional vertices in the three-dimensional model, in the plurality of three-dimensional vertices of the target point cloud image; and constructing the three-dimensional model of the target face in an original facial model based on three-dimensional coordinates and normal vectors of the vertices which corresponds to respective three-dimensional vertices in the three-dimensional model.

Further, the method further comprises: acquiring a plurality of frames of RGB images, in which the plurality of frames of RGB images are obtained by shooting the target face at different shooting angles; performing texture stitching on the plurality of frames of RGB images to obtain a target texture map; and rendering the three-dimensional model by using the target texture map to obtain the three-dimensional model that is rendered.

Further, performing texture stitching on the plurality of frames of RGB images to obtain the target texture map, comprises: determining texture features of respective vertices of the three-dimensional model in the plurality of frames of RGB images; performing UV unfolding processing on the three-dimensional model to obtain an unfolded image, in which the unfolded image comprises a plurality of two-dimensional coordinates, and one two-dimensional coordinate corresponds to one vertex in the three-dimensional model; and determining texture features corresponding to respective two-dimensional coordinates in the unfolded image, so as to obtain the target texture map.

Further, determining texture features of respective vertices of the three-dimensional model in the plurality of frames of RGB images, comprises: determining texture features corresponding to respective vertices of the three-dimensional model in the plurality of frames of RGB images, in which one vertex corresponds to one or more texture features; classifying the respective vertices according to an amount of texture features corresponding to the respective vertices to obtain a first classification group and a second classification group, in which each vertex in the first classification group corresponds to one texture feature, and each vertex in the second classification group corresponds to a plurality of texture features; taking texture features corresponding to respective vertices in the first classification group as texture features of vertices, which correspond to the respective vertices in the first classification group, in the three-dimensional model; and determining a target texture feature in the plurality of texture features corresponding to each vertex in the second classification group, and taking the target texture feature as a texture feature of a vertex, which corresponds to each vertex in the second classification group, in the three-dimensional model.

Further, determining the target texture feature in the plurality of texture features corresponding to each vertex in the second classification group, comprises: calculating a normal offset visual angle of a vertex Ai in the second classification group relative to a target camera, in which the target camera is a camera used for shooting a target RGB image, and the target RGB image is an RGB image, to which a plurality of texture features corresponding to the vertex Ai belong, in the plurality of frames of RGB images, wherein i takes one to I in sequence, and I is an amount of vertices in the second classification group; and taking a texture feature corresponding to a minimum normal offset visual angle of the normal offset visual angle as a target texture feature of the vertex Ai.

Further, the three-dimensional model comprises a plurality of vertices, and one vertex corresponds to one or more pixels in the target texture map; and rendering the three-dimensional model by using the target texture map to obtain the three-dimensional model that is rendered, comprises: searching texture features, which correspond to respective vertices, in the target texture map; and projecting the texture features onto the respective vertices of the three-dimensional model to obtain the three-dimensional model that is rendered.

In the second aspect, at least one embodiment of the present disclosure provides a face modeling apparatus, comprising: a first acquisition unit, configured to acquire a plurality of frames of depth images, in which the plurality of frames of depth images are obtained by shooting a target face with a depth camera at different shooting angles; a depth processing unit, configured to perform depth image alignment processing on the plurality of frames of depth images to obtain a target point cloud image, in which the target point cloud image comprises a plurality of three-dimensional vertices, and a three-dimensional coordinate and a normal vector of each three-dimensional vertex; and a construction unit, configured to construct a three-dimensional model of the target face by using the target point cloud image.

In the third aspect, at least one embodiment of the present disclosure provides an electronic device, comprising a memory, a processor, and a computer program stored on the memory and being capable of running on the processor, in which the computer program is capable of being executed by the processor to implement the method according to any one of the first aspect.

In the fourth aspect, at least one embodiment of the present disclosure provides a computer-readable medium having non-volatile program code executable by a processor, in which the program code is capable of being executed by the processor to implement the method according to any one of the first aspect.

In the embodiments of the present disclosure, first, the plurality of frames of depth images are acquired, and then depth image alignment processing is performed on the plurality of frames of depth images to obtain the target point cloud image; and finally, the three-dimensional model of the target face is constructed by using the target point cloud image. In the embodiments of the present disclosure, the depth image includes three-dimensional spatial information of the target face, and using the depth map to construct the three-dimensional model of the target face can obtain a three-dimensional model with higher accuracy. Furthermore, compared to the method of constructing a three-dimensional model based on RGB images, using the depth map to construct the three-dimensional model can improve the robustness of the three-dimensional model, thus alleviating the technical problems of poor robustness and low accuracy of the three-dimensional model constructed by another three-dimensional model construction method.

Other features and advantages of the present disclosure are described in the following specification, and partly become obvious from the specification, or understood by implementing the present disclosure. The objectives and other advantages of the present disclosure are realized and obtained by the structures specifically pointed out in the specification, claims and drawings.

In order to make the above-mentioned objectives, features and advantages of the present disclosure more obvious and understandable, optional embodiments accompanied with accompanying drawings are described in detail below.

BRIEF DESCRIPTION OF THE DRAWINGS

In order to more clearly explain the specific embodiments of the present disclosure or other technical solutions, the following will briefly introduce the drawings that need to be used in the specific embodiments. Obviously, the drawings in the following description are some embodiments of the present disclosure. For those of ordinary skill in the art, other drawings can be obtained based on these drawings without creative work.

DETAILED DESCRIPTION

In order to make objects, technical solutions and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

First, with reference to FIG. 1, an electronic device 100 for implementing an embodiment of the present disclosure will be described, and the electronic device 100 can be used to perform the face modeling method of respective embodiments of the present disclosure.

Figure 1:
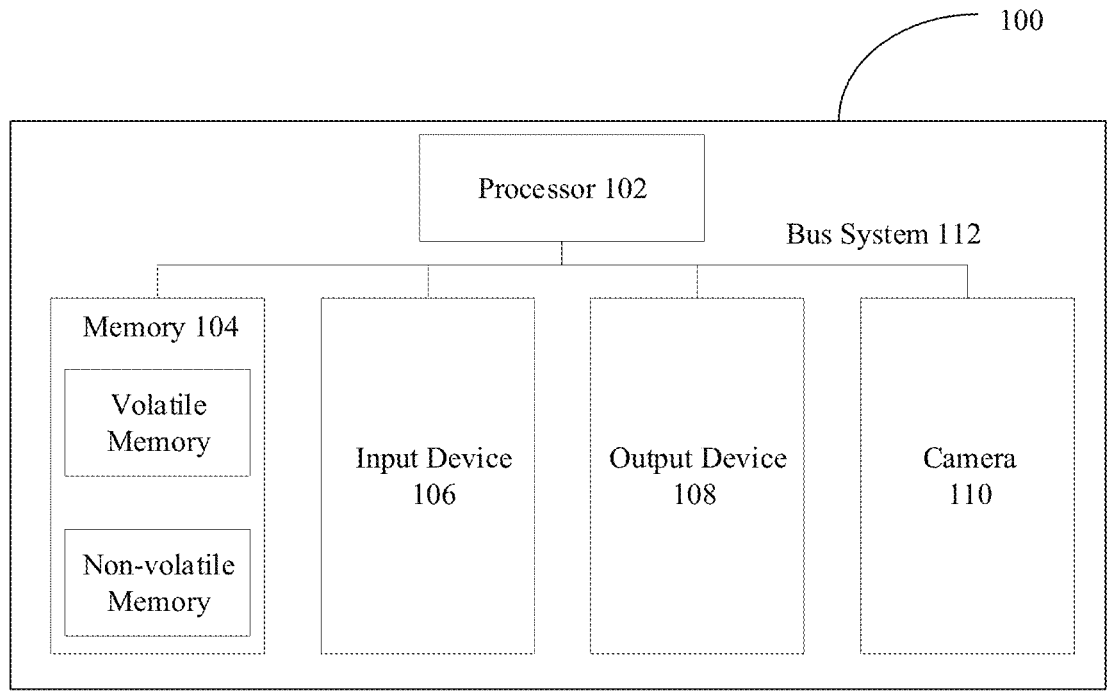
FIG. 1 is a schematic diagram of an electronic device according to at least one embodiment of the present disclosure.

As shown in FIG. 1, the electronic device 100 includes one or more processors 102, one or more memories 104, an input device 106, an output device 108, and a camera 110, which are interconnected by a bus system 112 and/or other forms of connection mechanism (not shown). It should be noted that the components and structures of the electronic device 100 as shown in FIG. 1 are only exemplary and not restrictive, and the electronic device may have other components and structures as required.

The processor 102 may be implemented in at least one hardware form of a digital signal processing (DSP), a field-programmable gate array (FPGA), a programmable logic array (PLA), and an application specific integrated circuit (ASIC), and the processor 102 may be a central processing unit (CPU), a graphics processor (GPU) or other forms of processing units with data processing capabilities and/or instruction execution capabilities, and can control other components in the electronic device 100 to perform desired functions.

The memory 104 may include one or more computer program products, the computer program products may include various forms of computer-readable storage medium, such as volatile memory and/or non-volatile memory. For example, the volatile memory may include random access memory (RAM) and/or cache, and the like. For example, the non-volatile memory may include a read-only memory (ROM), a hard disk, a flash memory, and the like. One or more computer program instructions can be stored on the computer-readable storage medium, and the processor 102 can execute the program instructions to realize the client functions and/or other desired functions in the embodiments of the present disclosure described below. The computer-readable storage medium can further store various applications and various data, such as various data used and/or generated by the applications.

The input device 106 may be a device used by a user to input instructions, and may include one or more of a keyboard, a mouse, a microphone, a touch screen, and the like.

The output device 108 can output various information (e.g., images or sounds) to the outside (e.g., a user), and may include one or more of a display, a speaker, and the like.

The camera 110 is used for image acquisition, and a plurality of frames of depth images captured by the camera are processed by the face modeling method to obtain a three-dimensional model of a target face. For example, the camera can shoot a plurality of frames of depth images desired by the user, and then the plurality of frames of depth images are processed by the face modeling method to obtain the three-dimensional model of the target face. The camera can further store the shot images in the memory 104 for use by other components.

For example, the electronic device for implementing the face modeling method according to at least one embodiment of the present disclosure can be implemented as an intelligent mobile terminal, such as a smart phone, a tablet computer, and the like.

According to the embodiments of the present disclosure, an embodiment of a face modeling method is provided. It should be noted that the steps shown in the flowcharts of the drawings can be executed, for example, in a computer system in which a set of instructions can be executed, and although the logical sequence is shown in the flowcharts, in some cases, the steps shown or described can be executed in a different sequence from that here.

Figure 2:
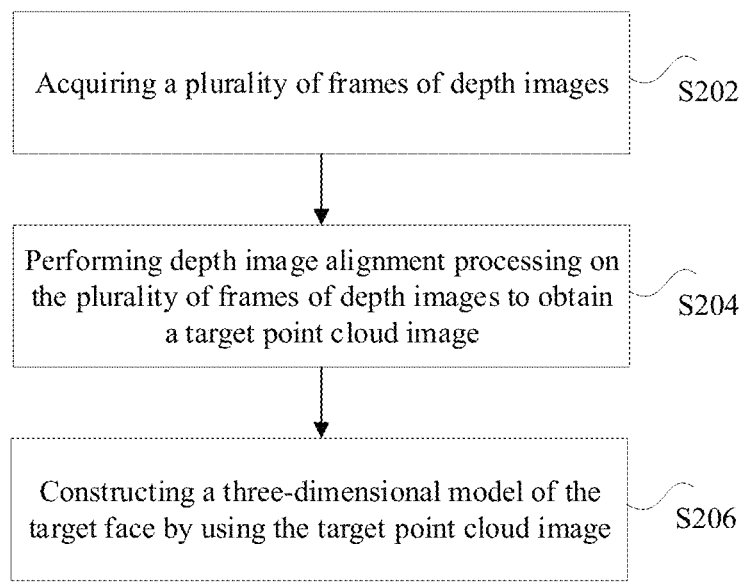
FIG. 2 is a flowchart of a face modeling method according to at least one embodiment of the present disclosure.

FIG. 2 is a flowchart of a face modeling method according to at least one embodiment of the present disclosure. As shown in FIG. 2, the method includes the following steps.

Step S202, acquiring a plurality of frames of depth images, in which the plurality of frames of depth images are obtained by shooting a target face with a depth camera at different shooting angles.

In the embodiments of the present disclosure, the plurality of frames of depth images of the target face can be acquired by structured light or ToF sensors. Optionally, in this embodiment, a plurality of ToF cameras can be set at different angles, for example, one ToF camera is set every 5 degrees with a certain point as a center of a circle, and then the depth images of the target face at various shooting angles are captured by the ToF camera.

Optionally, in the embodiments of the present disclosure, one ToF camera can also be set, and the target face can be shot at different shooting angles by adjusting the angle of the ToF camera, so as to obtain the plurality of frames of depth images. Or, in the case where the ToF camera is fixed, the plurality of frames of depth images can be captured by continuously turning the head of the target face to the left or right.

Step S204, performing depth image alignment processing on the plurality of frames of depth images to obtain a target point cloud image, in which the target point cloud image includes a plurality of three-dimensional vertices, and three-dimensional coordinates and normal vectors of respective three-dimensional vertices.

Step S206, constructing a three-dimensional model of the target face by using the target point cloud image.

In the embodiments of the present disclosure, first, the plurality of frames of depth images are acquired, and then depth image alignment processing is performed on the plurality of frames of depth images to obtain the target point cloud image; and finally, the three-dimensional model of the target face is constructed by using the target point cloud image. In the embodiments of the present disclosure, the depth image includes three-dimensional spatial information of the target face, and using the depth map to construct the three-dimensional model of the target face can obtain a three-dimensional model with higher accuracy. Furthermore, compared to the method of constructing a three-dimensional model based on RGB images, using the depth map to construct the three-dimensional model can improve the robustness of the three-dimensional model, thus alleviating the technical problems of poor robustness and low accuracy of the three-dimensional model constructed by another three-dimensional model construction method.

It can be seen from the above description that in this embodiment, first, the plurality of frames of depth images are acquired, and then depth image alignment processing is performed on the plurality of frames of depth images to obtain the target point cloud image.

In an optional implementation of this embodiment, in step S204, performing depth image alignment processing on the plurality of frames of depth images to obtain the target point cloud image includes the following steps.

Step S2041, transforming each frame of depth image into a three-dimensional point cloud image, in which the three-dimensional point cloud image includes three-dimensional coordinates and normal vectors of respective three-dimensional vertices in a point cloud.

Step S2042, performing vertex alignment processing on the respective three-dimensional vertices in respective three-dimensional point cloud images to obtain the target point cloud image.

Specifically, in this embodiment, the respective frames of depth images captured by the ToF camera are transformed into the three-dimensional point cloud images. First, parameters of the ToF camera are determined, and the parameters include internal parameters of the ToF camera, focal lengths of the ToF camera in X axe and Y axe, an aperture center of the ToF camera and other parameters; and the depth image is traversed to obtain a depth value of each coordinate in the depth image, a spatial coordinate of this coordinate is determine based on the depth value, and then the three-dimensional point cloud image of the depth image is obtained.

After transforming each depth image into the three-dimensional point cloud image, the three-dimensional vertices in the respective three-dimensional point cloud image can be vertex aligned to obtain the target point cloud image.

In this embodiment, in step S2042, performing alignment processing on the three-dimensional point cloud images of respective frames of depth images to obtain the target point cloud image includes the following steps.

Step S11, aiming at an M-th frame of depth image of the plurality of frames of depth images, performing point cloud matching on a three-dimensional point cloud image of the M-th frame of depth image and a predicted point cloud image, and determining pose information of the M-th frame of depth image shot by the depth camera according to a point cloud matching result; in which the predicted point cloud image is a point cloud image after aligning three-dimensional point cloud images of previous (M-1) frames of depth images, and the M-th frame of depth image is an M-th frame of depth image taken by the depth camera on the target face.

Step S12, determining position information of respective vertices in the three-dimensional point cloud image of the M-th frame of depth image in real space based on the pose information.

Step S13, fusing the three-dimensional point cloud image of the M-th frame of depth image into the predicted point cloud image by using the position information.

The above steps are repeatedly executed until a three-dimensional point cloud image of an N-th frame of depth image is fused into a predicted point cloud image, after aligning three-dimensional point cloud images of previous (N-1) frames of depth images, to obtain the target point cloud image. N is an amount of depth images, and M is less than or equal to N.

Because the depth images are taken by shooting the target face with the structured light or the ToF sensors at different shooting angles, adjacent depth images may include the same face region, for example, a first frame of depth image and a second frame of depth image may include the same face region. That is, a three-dimensional point cloud image of the first frame of depth image and a three-dimensional point cloud image of the second frame of depth image may include coincident three-dimensional vertices, and the coincident three-dimensional vertices correspond to the same position in the real space.

It is assumed that in this embodiment, N frames of depth images are acquired in sequence. In this embodiment, first, a first frame of depth image is acquired, and after the first frame of depth image is acquired, the first frame of depth image is transformed into a three-dimensional point cloud image, and the three-dimensional point cloud image is mapped to the predicted point cloud image. After obtaining a second frame of depth image, the second frame of depth image is transformed into a three-dimensional point cloud image, which is matched with the predicted point cloud image to determine the pose information of the second frame of depth image shot by the depth camera according to a matching result. And based on the pose information, the position information, in the real space, of respective vertices in the three-dimensional point cloud image of the second frame of depth image is determined. Then, the position information is used to determine the coincident three-dimensional vertices between the three-dimensional point cloud image of the second frame of depth image and the three-dimensional point cloud image of the first frame of depth image. Finally, the vertices in the three-dimensional point cloud image of the second frame of depth image except the coincident three-dimensional vertices are mapped in the predicted point cloud image. Therefore, the three-dimensional point cloud image of the second frame of depth image is fused into the predicted point cloud image.

For each depth image of the N frames of depth images, the above-mentioned processing method is adopted to perform alignment processing, and the alignment process of other depth images will not be described in detail herein.

In this embodiment, after performing alignment processing on the plurality of frames of depth images to obtain the target point cloud image, the three-dimensional model of the target face can be constructed by using the target point cloud image.

In an optional embodiment, in step S206, constructing the three-dimensional model of the target face by using the target point cloud image includes the following steps.

Step S2061, determining vertices, which corresponds to respective three-dimensional vertices in the three-dimensional model, in the plurality of three-dimensional vertices of the target point cloud image.

Step S2062, constructing the three-dimensional model of the target face in an original facial model based on three-dimensional coordinates and normal vectors of the vertices which corresponds to respective three-dimensional vertices in the three-dimensional model.

Specifically, in this embodiment, the three-dimensional model includes a plurality of three-dimensional vertices, and one three-dimensional vertex corresponds to one vertex in the target point cloud image. Based on this case, in this embodiment, the vertices corresponding to the respective three-dimensional vertices in the three-dimensional model can be determined in the vertices of the target point cloud image through the mapping relationship between respective three-dimensional vertices in the three-dimensional model and respective vertices in the target point cloud image. Then, the three-dimensional coordinates and normal vectors of the vertices corresponding to respective three-dimensional vertices in the three-dimensional model are obtained. Finally, the three-dimensional model of the target face is constructed in the original facial model by using the three-dimensional coordinates and normal vectors of the corresponding vertices.

It should be noted that the original facial model herein is a facial model without any processing.

Figure 3:
FIG. 3 is a schematic diagram of a three-dimensional model according to at least one embodiment of the present disclosure.
Figure 4:
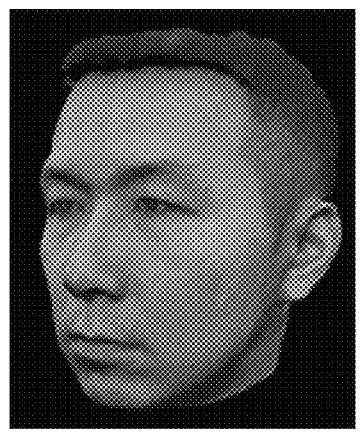
FIG. 4 is a schematic diagram of a three-dimensional model which is rendered according to at least one embodiment of the present disclosure.

For example, as shown in FIG. 3, it is a three-dimensional model of the target face. The three-dimensional model as shown in FIG. 3 is a model without color rendering. If the color-rendered model is required, a RGB image of the target face is needed to be obtained, and the three-dimensional model is rendered in combination with the RGB image to obtain the three-dimensional model as shown in FIG. 4.

It should be noted that in this embodiment, in the process of modeling with the target point cloud image, some depth image noise will be discarded by using the prior knowledge of the face, thereby reducing the interference caused by the poor quality of the depth image to modeling and improving the modeling quality and accuracy.

In an optional embodiment, the method further includes the following steps.

Step S208, acquiring a plurality of frames of RGB images, in which the plurality of frames of RGB images are obtained by shooting the target face at different shooting angles.

Step S210, performing texture stitching on the plurality of frames of RGB images to obtain a target texture map.

Step S212, rendering the three-dimensional model by using the target texture map to obtain the three-dimensional model that is rendered.

In this embodiment, the plurality of frames of RGB images of the target face can be acquired by an RGB camera. Optionally, in this embodiment, a plurality of RGB cameras can be set at different angles, for example, taking a certain point as a center of a circle, RGB cameras are respectively set at front, 90 degrees on the left side and 90 degrees on the right side of the target face, and then the depth images of the target face at the above three shooting angles are captured by the RGB cameras.

Optionally, in this embodiment, one RGB camera can also be set, and the acquisition of the plurality of frames of RGB images can be realized by continuously turning the head of the target face to the left or right under the case that the one RGB camera is fixed.

Figure 5:
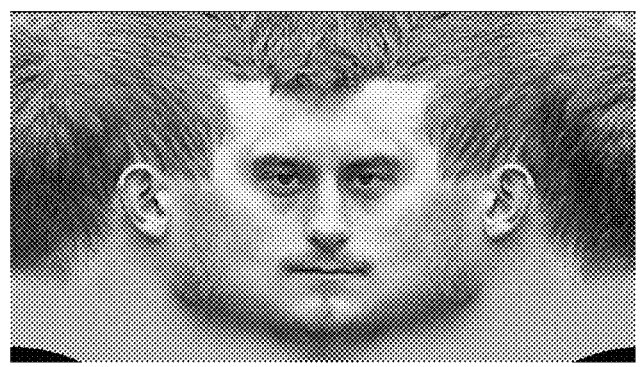
FIG. 5 is a schematic diagram of a target texture map according to at least one embodiment of the present disclosure.

After obtaining the plurality of frames of RGB images, texture stitching can be performed on the plurality of frames of RGB images to obtain a target texture map. It is assumed that three RGB images are captured, which are taken on the front, 90 degrees on the left side and 90 degrees on the right side of the target face, and after performing texture stitching on the three RGB images, the target texture map as shown in FIG. 5 is obtained.

In an optional embodiment, in step S210, performing texture stitching on the plurality of frames of RGB images to obtain the target texture map includes the following steps.

Step S2101, determining texture features of respective vertices of the three-dimensional model in the plurality of frames of RGB images.

Step S2102, performing UV unfolding processing on the three-dimensional model to obtain an unfolded image, in which the unfolded image includes a plurality of two-dimensional coordinates, and one two-dimensional coordinate corresponds to one vertex in the three-dimensional model.

Step S2103, determining texture features corresponding to respective two-dimensional coordinates in the unfolded image, so as to obtain the target texture map.

In this embodiment, the constructed three-dimensional model includes a plurality of vertices. The corresponding texture features of each vertex on the three-dimensional model can be found in the plurality of frames of RGB images. Because there are a plurality of shooting angles, some vertices in the three-dimensional model are mapped to the plurality of texture features.

After that, the UV unfolding processing is performed on the three-dimensional model, and an unfolded image is obtained. It should be noted that the unfolded image includes a plurality of two-dimensional coordinates, and one two-dimensional coordinate corresponds to one three-dimensional vertex on the three-dimensional model.

Based on this case, in this embodiment, if the texture features corresponding to respective two-dimensional coordinates in the unfolded image can be determined, the texture features corresponding to respective three-dimensional vertices in the three-dimensional model can be obtained.

In this embodiment, the texture features of the respective three-dimensional vertices in the three-dimensional model can be determined in the plurality of frames of RGB images in the following method.

First, the texture features corresponding to the respective vertices in the three-dimensional model are determined in the plurality of frames of RGB images, and one vertex corresponds to one or more texture features.

Then, the respective vertices are classified according to an amount of texture features corresponding to the respective vertices to obtain a first classification group and a second classification group, each vertex in the first classification group corresponds to one texture feature, and each vertex in the second classification group corresponds to a plurality of texture features.

Then, the texture features corresponding to respective vertices in the first classification group is taken as texture features of vertices, which correspond to the respective vertices in the first classification group, in the three-dimensional model.

Finally, a target texture feature is determined in the plurality of texture features corresponding to each vertex in the second classification group, and the target texture feature is taken as the texture feature of a vertex, which corresponds to each vertex in the second classification group, in the three-dimensional model.

It can be seen from the above description that some three-dimensional vertices in the three-dimensional model are mapped to a plurality of texture features, and some other three-dimensional vertices in the three-dimensional model are mapped to one texture feature. Based on this case, in this embodiment, the three-dimensional vertices can be classified according to the amount of texture features mapped by the respective three-dimensional vertices of the three-dimensional model.

For example, first, it is necessary to determine the amount of texture features, which corresponds to the respective three-dimensional vertices in the three-dimensional model, in the plurality of frames of RGB images. Then, the respective three-dimensional vertices are divided into the first classification group and the second classification group according to the amount of texture features. The respective vertices in the first classification group map one texture feature, and the respective vertices in the second classification group map the plurality of texture features.

After the first classification group and the second classification group are obtained, the texture features mapped by the respective three-dimensional vertices in the first classification group can be taken as the texture features of the respective three-dimensional vertices. Furthermore, for each three-dimensional vertex in the second classification group, it is necessary to select one texture feature from its mapped texture features as the texture feature of the three-dimensional vertex.

The method includes the following steps: first, calculating a normal offset visual angle of a vertex Ai in the second classification group relative to a target camera, in which the target camera is a camera used for shooting a target RGB image, and the target RGB image is an RGB image, to which a plurality of texture features corresponding to the vertex Ai belong, in the plurality of frames of RGB images, i takes one to I in sequence, and I is an amount of the vertices in the second classification group; and then taking a texture feature corresponding to a minimum normal offset visual angle of the normal offset visual angle as a target texture feature of the vertex Ai.

It can be seen from the above description that the three-dimensional model includes a plurality of vertices, and one vertex corresponds to one or more pixels in the target texture map.

Based on this case, rendering the three-dimensional model by using the target texture map to obtain the three-dimensional model that is rendered includes: searching texture features, which correspond to respective vertices, in the target texture map; and projecting the texture features onto the respective vertices of the three-dimensional model to obtain the three-dimensional model that is rendered.

Specifically, in this embodiment, when rendering the three-dimensional model, it is necessary to find the projection color (or texture feature) of each vertex in the three-dimensional model in the texture map. And the texture features are projected onto the three-dimensional model. Finally, a color model as shown in FIG. 4 is rendered.

It can be seen from the above description that in this embodiment, the depth image includes the three-dimensional spatial information of the target face, and using the depth map to construct the three-dimensional model of the target face can obtain a three-dimensional model with higher accuracy. Furthermore, compared to the method of constructing a three-dimensional model based on RGB images, using the depth map to construct the three-dimensional model can improve the robustness of the three-dimensional model, thus alleviating the technical problems of poor robustness and low accuracy of the three-dimensional model constructed by another three-dimensional model construction method.

Figure 6:
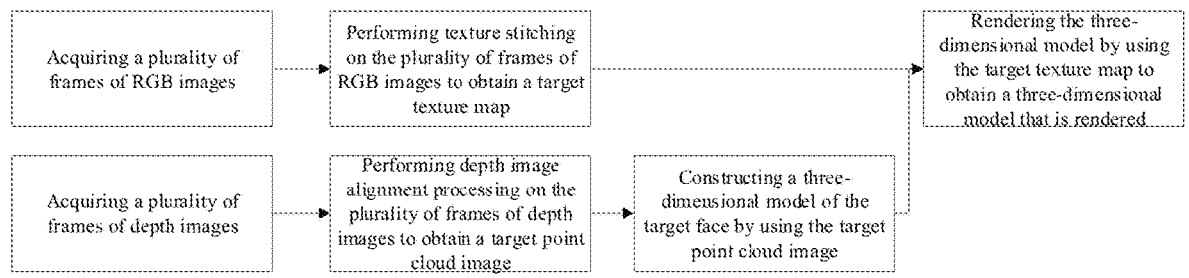
FIG. 6 is a flowchart of another face modeling method according to at least one embodiment of the present disclosure.

FIG. 6 is a flowchart of another face modeling method according to at least one embodiment of the present disclosure. As shown in FIG. 6, the method includes the following steps.

A plurality of frames of RGB images are acquired, and the plurality of frames of RGB images are obtained by shooting the target face at different shooting angles. The texture stitching is performed on the plurality of frames of RGB images to obtain a target texture map. The plurality of frames of depth images are acquired, and the plurality of frames of depth images are obtained by shooting the target face at different shooting angles. The depth image alignment processing is performed on the plurality of frames of depth images to obtain a target point cloud image. The three-dimensional model of the target face is constructed by using the target point cloud image. The three-dimensional model is rendered by using the target texture map to obtain the three-dimensional model that is rendered. The specific process is described above, and will not be described in detail herein.

At least one embodiment of the present disclosure further provides a face modeling apparatus, the face modeling apparatus is mainly used for executing the face modeling method provided by the embodiments of the present disclosure. The face modeling apparatus provided by the embodiment of the present disclosure is described in detail below.

Figure 7:
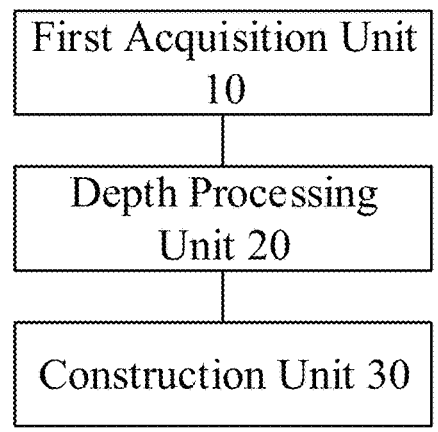
FIG. 7 is a schematic diagram of a face modeling apparatus according to at least one embodiment of the present disclosure.

FIG. 7 is a schematic diagram of a face modeling apparatus according to at least one embodiment of the present disclosure. As shown in FIG. 7, the face modeling apparatus mainly includes a first acquisition unit 10, a depth processing unit 20, and a construction unit 30.

The first acquisition unit 10 is configured to acquire a plurality of frames of depth images, and the plurality of frames of depth images are obtained by shooting a target face with a depth camera at different shooting angles.

The depth processing unit 20 is configured to perform depth image alignment processing on the plurality of frames of depth images to obtain a target point cloud image, and the target point cloud image includes a plurality of three-dimensional vertices, and a three-dimensional coordinate and a normal vector of each three-dimensional vertex.

The construction unit 30 is configured to construct a three-dimensional model of the target face by using the target point cloud image.

In the embodiments of the present disclosure, first, the plurality of frames of depth images are acquired, and then the depth image alignment processing is performed on the plurality of frames of depth images to obtain a target point cloud image; finally, the three-dimensional model of the target face is constructed by using the target point cloud image. In the embodiments of the present disclosure, the depth image includes the three-dimensional spatial information of the target face, and using the depth map to construct the three-dimensional model of the target face can obtain a three-dimensional model with higher accuracy. Furthermore, compared to the method of constructing a three-dimensional model based on RGB images, using the depth map to construct the three-dimensional model can improve the robustness of the three-dimensional model, thus alleviating the technical problems of poor robustness and low accuracy of the three-dimensional model constructed by another three-dimensional model construction method.

Optionally, the depth processing unit includes an image transformation module and an image alignment processing module. The image transformation module is used for transforming each frame of depth image into a three-dimensional point cloud image, and the three-dimensional point cloud image includes three-dimensional coordinates and normal vectors of respective three-dimensional vertices in a point cloud. The image alignment processing module is used for performing vertex alignment processing on the respective three-dimensional vertices in respective three-dimensional point cloud images to obtain the target point cloud image.

Optionally, the image alignment processing module is further used for performing the following steps: aiming at an M-th frame of depth image of the plurality of frames of depth images, performing point cloud matching on a three-dimensional point cloud image of the M-th frame of depth image and a predicted point cloud image, and determining pose information of the M-th frame of depth image shot by the depth camera according to a point cloud matching result; determining position information of respective vertices in the three-dimensional point cloud image of the M-th frame of depth image in real space based on the pose information; fusing the three-dimensional point cloud image of the M-th frame of depth image into the predicted point cloud image by using the position information; and repeatedly executing the above steps by the image alignment processing module until a three-dimensional point cloud image of an N-th frame of depth image being fused into a predicted point cloud image, after aligning three-dimensional point cloud images of previous (N-1) frames of depth images, to obtain the target point cloud image, in which N is an amount of depth images, M is less than or equal to N, the predicted point cloud image is a point cloud image after aligning three-dimensional point cloud images of previous (M-1) frames of depth images, and the M-th frame of depth image is an M-th frame of depth image taken by the depth camera on the target face.

Optionally, in the case where the three-dimensional model includes a plurality of three-dimensional vertices, and one three-dimensional vertex corresponds to one vertex in the target point cloud image, the construction unit is configured to perform the following steps: determining vertices, which corresponds to respective three-dimensional vertices in the three-dimensional model, in the plurality of three-dimensional vertices of the target point cloud image; and constructing the three-dimensional model of the target face in an original facial model based on three-dimensional coordinates and normal vectors of the vertices which corresponds to respective three-dimensional vertices in the three-dimensional model.

Optionally, the apparatus further includes: a second acquisition unit for acquiring a plurality of frames of RGB images which are obtained by shooting the target face at different shooting angles; a texture stitching unit for performing texture stitching on the plurality of frames of RGB images to obtain a target texture map; and a rendering unit for rendering the three-dimensional model by using the target texture map to obtain the three-dimensional model that is rendered.

Optionally, the texture stitching unit is used for performing the following steps: determining texture features of respective vertices of the three-dimensional model in the plurality of frames of RGB images; performing UV unfolding processing on the three-dimensional model to obtain an unfolded image, in which the unfolded image includes a plurality of two-dimensional coordinates, and one two-dimensional coordinate corresponding to one vertex in the three-dimensional model; and determining texture features corresponding to respective two-dimensional coordinates in the unfolded image, so as to obtain the target texture map.

Optionally, the texture stitching unit is further used for performing the following steps: determining texture features corresponding to respective vertices of the three-dimensional model in the plurality of frames of RGB images, in which one vertex corresponds to one or more texture features; classifying the respective vertices according to an amount of texture features corresponding to the respective vertices to obtain a first classification group and a second classification group, in which each vertex in the first classification group corresponds to one texture feature, and each vertex in the second classification group corresponds to a plurality of texture features; taking texture features corresponding to respective vertices in the first classification group as a texture feature of vertices, which corresponds to the respective vertices in the first classification group, in the three-dimensional model; and determining a target texture feature in the plurality of texture features corresponding to each vertex in the second classification group, and taking the target texture feature as a texture feature of a vertex, which corresponds to each vertex in the second classification group, in the three-dimensional model.

Optionally, the texture stitching unit is further used for performing the following steps: calculating a normal offset visual angle of a vertex Ai in the second classification group relative to a target camera, in which the target camera is a camera used for shooting a target RGB image, and the target RGB image is an RGB image, to which a plurality of texture features corresponding to the vertex Ai belong, in the plurality of frames of RGB images, i taking one to I in sequence, and I is an amount of vertices in the second classification group; and taking a texture feature corresponding to a minimum normal offset visual angle of the normal offset visual angle as a target texture feature of the vertex Ai.

Optionally, the three-dimensional model includes a plurality of vertices, and one vertex corresponds to one or more pixels in the target texture map; and the rendering unit is further used for performing the following steps: searching texture features, which correspond to respective vertices, in the target texture map; and projecting the texture features onto the respective vertices of the three-dimensional model to obtain the three-dimensional model that is rendered.

At least one embodiment of the present disclosure further provides a computer-readable medium having non-volatile program code executable by a processor, the program code enables the processor to execute the method described in any one of the above first aspect.

The implementation principle and technical effects of the apparatus provided by the embodiment of the present disclosure are the same as those of the foregoing method embodiments. For brief description, for those portions not mentioned in the apparatus embodiments, please refer to the corresponding contents in the foregoing method embodiments.

In addition, in the description of embodiments of the present disclosure, unless otherwise specified and limited, the terms "installation", "connect" and "connected" should be understood in a broad sense, for example, it can be fixed connection, detachable connection or integrated connection; it can be connected mechanically or electrically. It can be directly connected, indirectly connected through an intermediate medium, or communicated inside two elements. For those of ordinary skilled in the art, the specific meanings of the above terms in the present disclosure can be understood in specific situations.

In the description of the present disclosure, it should be noted that the orientation or position relationships indicated by the terms "center", "upper", "lower", "left", "right", "vertical", "horizontal", "inner" and "outer" are based on the orientation or position relationships as shown in the drawings, only for convenience of describing the present disclosure and simplifying the description, but not for indicating or implying that the referred device or element must have a specific orientation, be constructed and operate in a specific orientation, and therefore should not be construed as a limitation of the present disclosure. In addition, the terms "first", "second" and "third" are only used for descriptive purposes and cannot be understood as indicating or implying relative importance.

It can be clearly understood by those skilled in the art that for the convenience and conciseness of description, the specific working processes of the systems, devices and units described above can refer to the corresponding processes in the aforementioned method embodiments, and will not be described in detail herein.

In the embodiments provided of the present disclosure, it should be understood that the disclosed system, device and method can be implemented in other ways. The device embodiments described above are only schematic. For example, the division of the unit is only a logical function division, and there may be another division mode in actual implementation. For another example, a plurality of units or components may be combined or integrated into another system, or some features may be ignored or not implemented. On the other hand, the mutual coupling or direct coupling or communication connection as shown or discussed may be indirect coupling or communication connection through some communication interfaces, the indirect coupling or communication connection of devices or units may be in electrical, mechanical or other forms.

The units described as separated components may or may not be physically separated, and the components displayed as units may or may not be physical units, that is, they may be located at one place or distributed to a plurality of network units. Some or all of the units can be selected according to actual needs to achieve the purpose of the embodiments of the present disclosure.

In addition, respective functional units in each embodiment of the present disclosure may be integrated into one processing unit, or each unit may physically exist separately, or two or more units may be integrated into one unit.

If the functions are realized in the form of software functional units and sold or used as independent products, they can be stored in a non-volatile computer-readable storage medium executable by a processor. Based on this understanding, the technical solution of the present disclosure or the part that contributes to the prior art or the part of the technical solution can be embodied in the form of a software product, which is stored in a storage medium and includes several instructions to enable a computer device (which may be a personal computer, a server, or a network device, etc.) execute all or part of the steps of the method described in each embodiment of the present disclosure. The aforementioned storage medium includes U disk, mobile hard disk, ROM (Read-Only Memory), RAM (Random Access Memory), magnetic disk or optical disk, etc., which can store program codes.

Finally, it should be noted that the above-mentioned embodiments are only specific embodiments of the present disclosure, which are used to illustrate the technical solutions of the present disclosure, but not to limit it. Although the present disclosure has been described in detail with reference to the above-mentioned embodiments, ordinary skilled in the art should understand that anyone familiar with those skilled in the art can still modify or easily think of changes to the technical solutions described in the above-mentioned embodiments within the technical scope disclosed in the present disclosure, or equivalent replacement of some technical features. However, these modifications, changes or replacements do not enable the essence of the corresponding technical solutions deviate from the spirit and scope of the technical solutions of the embodiments of the present disclosure, and should be covered within the protection scope of the present disclosure. Therefore, the protection scope of the present disclosure shall be subject to the protection scope of the claims.

What is claimed is:

1. A face modeling method, comprising:
    acquiring a plurality of frames of depth images, wherein the plurality of frames of depth images are obtained by shooting a target face with a depth camera at different shooting angles;
    performing depth image alignment processing on the plurality of frames of depth images to obtain a target point cloud image, wherein the target point cloud image comprises a plurality of three-dimensional vertices, and both a three-dimensional coordinate and a normal vector of each three-dimensional vertex of the plurality of three-dimensional vertices; and
    constructing a three-dimensional model of the target face by using the target point cloud image,
    wherein performing depth image alignment processing on the plurality of frames of depth images to obtain the target point cloud image, comprises:
    transforming each frame of a depth image into a three-dimensional point cloud image, wherein the three-dimensional point cloud image comprises three-dimensional coordinates and normal vectors of respective three-dimensional vertices in a point cloud; and
    performing vertex alignment processing on the respective three-dimensional vertices in respective three-dimensional point cloud images to obtain the target point cloud image, and
    wherein performing vertex alignment processing on the respective three-dimensional vertices in respective three-dimensional point cloud images to obtain the target point cloud image, comprises:
    aiming at an M-th frame of the depth image of the plurality of frames of depth images, performing point cloud matching on the three-dimensional point cloud image of the M-th frame of depth image and a predicted point cloud image, and determining pose information of the M-th frame of the depth image shot by the depth camera according to a point cloud matching result;
    determining position information of respective vertices in the three-dimensional point cloud image of the M-th frame of the depth image in real space based on the pose information;
    fusing the three-dimensional point cloud image of the M-th frame of depth image into the predicted point cloud image by using the position information; and
    repeatedly executing the above steps until a three-dimensional point cloud image of an N-th frame of depth image is fused into a predicted point cloud image, after aligning three-dimensional point cloud images of previous (N-1) frames of depth images, to obtain the target point cloud image,
    wherein N is an amount of depth images, M is less than or equal to N, the predicted point cloud image is a point cloud image after aligning three-dimensional point cloud images of previous (M-1) frames of depth images, and the M-th frame of depth image is an M-th frame of depth image taken by the depth camera on the target face.

2. The method according to claim 1, wherein the three-dimensional model comprises a plurality of three-dimensional vertices, and one three-dimensional vertex corresponds to one vertex in the target point cloud image; and
    constructing the three-dimensional model of the target face by using the target point cloud image, comprises:
        determining vertices, which corresponds to respective three-dimensional vertices in the three-dimensional model, in the plurality of three-dimensional vertices of the target point cloud image; and
        constructing the three-dimensional model of the target face in an original facial model based on three-dimensional coordinates and normal vectors of the vertices which corresponds to respective three-dimensional vertices in the three-dimensional model.

3. The method according to claim 1, further comprising:
    acquiring a plurality of frames of RGB images, wherein the plurality of frames of RGB images are obtained by shooting the target face at different shooting angles;
    performing texture stitching on the plurality of frames of RGB images to obtain a target texture map; and
    rendering the three-dimensional model by using the target texture map to obtain the three-dimensional model that is rendered.

4. The method according to claim 3, wherein performing texture stitching on the plurality of frames of RGB images to obtain the target texture map, comprises:

determining texture features of respective vertices of the three-dimensional model in the plurality of frames of RGB images;

performing UV unfolding processing on the three-dimensional model to obtain an unfolded image, wherein the unfolded image comprises a plurality of two-dimensional coordinates, and one two-dimensional coordinate corresponds to one vertex in the three-dimensional model; and determining texture features corresponding to respective two-dimensional coordinates in the unfolded image, so as to obtain the target texture map.

5. The method according to claim 4, wherein determining texture features of respective vertices of the three-dimensional model in the plurality of frames of RGB images, comprises:

determining texture features corresponding to respective vertices of the three-dimensional model in the plurality of frames of RGB images, wherein one vertex corresponds to one or more texture features;

classifying the respective vertices according to an amount of texture features corresponding to the respective vertices to obtain a first classification group and a second classification group, wherein each vertex in the first classification group corresponds to one texture feature, and each vertex in the second classification group corresponds to a plurality of texture features;

taking texture features corresponding to respective vertices in the first classification group as texture features of vertices, which correspond to the respective vertices in the first classification group, in the three-dimensional model; and determining a target texture feature in the plurality of texture features corresponding to each vertex in the second classification group, and taking the target texture feature as a texture feature of a vertex, which corresponds to each vertex in the second classification group, in the three-dimensional model.

6. The method according to claim 5, wherein determining the target texture feature in the plurality of texture features corresponding to each vertex in the second classification group, comprises:

calculating a normal offset visual angle of a vertex Ai in the second classification group relative to a target camera, wherein the target camera is a camera used for shooting a target RGB image, and the target RGB image is an RGB image, to which a plurality of texture features corresponding to the vertex Ai belong, in the plurality of frames of RGB images, wherein i takes one to I in sequence, and I is an amount of vertices in the second classification group; and taking a texture feature corresponding to a minimum normal offset visual angle of the normal offset visual angle as a target texture feature of the vertex Ai.

7. An electronic device, comprising a memory, a processor, and a computer program stored on the memory and being capable of running on the processor, wherein the computer program is capable of being executed by the processor to implement the method according to claim 6.

8. An electronic device, comprising a memory, a processor, and a computer program stored on the memory and being capable of running on the processor, wherein the computer program is capable of being executed by the processor to implement the method according to claim 5.

9. An electronic device, comprising a memory, a processor, and a computer program stored on the memory and being capable of running on the processor, wherein the computer program is capable of being executed by the processor to implement the method according to claim 4.

10. The method according to claim 3, wherein the three-dimensional model comprises a plurality of vertices, and one vertex corresponds to one or more pixels in the target texture map; and rendering the three-dimensional model by using the target texture map to obtain the three-dimensional model that is rendered, comprises:
searching texture features, which correspond to respective vertices, in the target texture map; and
projecting the texture features onto the respective vertices of the three-dimensional model to obtain the three-dimensional model that is rendered.

11. An electronic device, comprising a memory, a processor, and a computer program stored on the memory and being capable of running on the processor, wherein the computer program is capable of being executed by the processor to implement the method according to claim 3.

12. An electronic device, comprising a memory, a processor, and a computer program stored on the memory and being capable of running on the processor, wherein the computer program is capable of being executed by the processor to implement the method according to claim 1.

13. A computer-readable medium having non-volatile program code executable by a processor, wherein the program code is capable of being executed by the processor to implement the method according to claim 1.

14. A face modeling apparatus, comprising:
a first acquisition unit, configured to acquire a plurality of frames of depth images, wherein the plurality of frames of depth images are obtained by shooting a target face with a depth camera at different shooting angles;
a depth processing unit, configured to perform depth image alignment processing on the plurality of frames of depth images to obtain a target point cloud image, wherein the target point cloud image comprises a plurality of three-dimensional vertices, and both a three-dimensional coordinate and a normal vector of each three-dimensional vertex of the plurality of three-dimensional vertices; and
a construction unit, configured to construct a three-dimensional model of the target face by using the target point cloud image,
wherein the depth processing unit comprises:
an image transformation module, configured to transform each frame of a depth image into a three-dimensional point cloud image, wherein the three-dimensional point cloud image comprises three-dimensional coordinates and normal vectors of respective three-dimensional vertices in a point cloud; and
an image alignment processing module, configured to perform vertex alignment processing on the respective three-dimensional vertices in respective three-dimensional point cloud images to obtain the target point cloud image,
wherein the image alignment processing module is configured to:
aim at an M-th frame of the depth image of the plurality of frames of depth images, perform point cloud matching on a three-dimensional point cloud image of the M-th frame of the depth image and a predicted point cloud image, and determine pose information of the M-th frame of the depth image shot by the depth camera according to a point cloud matching result;

determine position information of respective vertices in the three-dimensional point cloud image of the M-th frame of the depth image in real space based on the pose information;

fuse the three-dimensional point cloud image of the M-th frame of the depth image into the predicted point cloud image by using the position information; and repeatedly execute the above steps until a three-dimensional point cloud image of an N-th frame of the depth image is fused into a predicted point cloud image, after aligning three-dimensional point cloud images of previous (N-1) frames of the depth images, to obtain the target point cloud image, wherein N is an amount of the depth images, M is less than or equal to N, the predicted point cloud image is a point cloud image after aligning three-dimensional point cloud images of previous (M-1) frames of the depth images, and the M-th frame of the depth image is an M-th frame of the depth image taken by the depth camera on the target face.

15. The face modeling apparatus according to claim 14, further comprising:

a second acquisition unit, configured to acquire a plurality of frames of RGB images, wherein the plurality of frames of RGB images are obtained by shooting the target face at different shooting angles;

a texture stitching unit, configured to perform texture stitching on the plurality of frames of RGB images to obtain a target texture map; and a rendering unit, configured to render the three-dimensional model by using the target texture map to obtain the three-dimensional model that is rendered.

* * * * *